(12) United States Patent
Decker et al.

(10) Patent No.: US 8,411,595 B2
(45) Date of Patent: Apr. 2, 2013

(54) SYSTEM AND METHOD FOR PROVIDING RESERVATIONLESS CONFERENCING

(75) Inventors: Eran Decker, Givataeeim (IL); Rami Boneh, Rosh Haayin (IL)

(73) Assignee: Polycom, Inc., San Jose, CA (US)

( * ) Notice: Subject to any disclaimer, the term of this patent is extended or adjusted under 35 U.S.C. 154(b) by 1103 days.

(21) Appl. No.: 11/945,078

(22) Filed: Nov. 26, 2007

(65) Prior Publication Data

US 2008/0069012 A1    Mar. 20, 2008

Related U.S. Application Data

(60) Continuation of application No. 10/954,934, filed on Sep. 30, 2004, now Pat. No. 7,310,320, which is a division of application No. 09/790,577, filed on Feb. 22, 2001, now Pat. No. 7,085,243.

(60) Provisional application No. 60/186,002, filed on Mar. 1, 2000.

(51) Int. Cl.
*H04L 12/16* (2006.01)

(52) U.S. Cl. ........ 370/260; 370/261; 370/262; 370/263; 370/351; 370/352; 709/223; 709/226; 709/204; 709/231

(58) Field of Classification Search ......... 370/3.51–356; 709/223, 226
See application file for complete search history.

(56) References Cited

U.S. PATENT DOCUMENTS

| | | |
|---|---|---|
| 4,455,455 A | 6/1984 | Little |
| 5,436,962 A | 7/1995 | Hirata |
| 5,574,911 A | 11/1996 | D'Angelo et al. |
| 5,657,096 A | 8/1997 | Lukacs |
| 5,737,011 A | 4/1998 | Lukacs |
| 5,812,652 A | 9/1998 | Jodoin et al. |
| 5,835,129 A | 11/1998 | Kumar |
| 5,852,466 A | 12/1998 | Komine et al. |
| 5,896,128 A | 4/1999 | Boyer |
| 5,907,324 A * | 5/1999 | Larson et al. ............... 715/753 |
| 5,959,662 A | 9/1999 | Shaffer et al. |
| 5,978,363 A | 11/1999 | Dimitrijevic et al. |
| 5,995,608 A | 11/1999 | Detampel, Jr. et al. |
| 6,021,263 A | 2/2000 | Kujoory et al. |
| 6,038,304 A | 3/2000 | Hart |
| 6,163,531 A * | 12/2000 | Kumar ....................... 370/260 |

(Continued)

FOREIGN PATENT DOCUMENTS

| | | |
|---|---|---|
| GB | 2 313 250 A | 11/1997 |
| WO | 96/63157 A1 | 11/1996 |

(Continued)

OTHER PUBLICATIONS

Schaphorst, Richard; "Status of Standards for Teleconferencing & Multimedia Communications;" IEEE; Nov. 1997; pp. 213-217.

(Continued)

*Primary Examiner* — Asad Nawaz
*Assistant Examiner* — Khaled Kassim
(74) *Attorney, Agent, or Firm* — Wong, Cabello, Lutsch, Rutherford & Brucculeri, LLP

(57) ABSTRACT

A video teleconferencing system and method for providing reservationless conferencing is disclosed. The method involves creating a conference profile identifying selected connection parameters; allocating a dial-in number; notifying participants of the dial-in number; detecting a call from a requesting participant; determining if sufficient resources for the participant are available; and connecting the requesting participant into the reservationless conference. Additionally, the video teleconferencing method allows the conference time to be automatically extended. This is done using timers and reallocating available resources when the original end of conference time arrives. The method also enables the conference to automatically terminate after all conference participants leave the conference.

12 Claims, 6 Drawing Sheets

U.S. PATENT DOCUMENTS

| | | | |
|---|---|---|---|
| 6,181,786 B1 | 1/2001 | Detampel, Jr. et al. | |
| 6,195,117 B1 | 2/2001 | Miyazaki | |
| 6,463,038 B1 | 10/2002 | Wilson | |
| 6,611,503 B1 | 8/2003 | Fitzgerald et al. | |
| 6,646,997 B1 * | 11/2003 | Baxley et al. | 370/260 |
| 6,657,975 B1 * | 12/2003 | Baxley et al. | 370/260 |
| 6,731,734 B1 | 5/2004 | Shaffer et al. | |
| 6,816,469 B1 * | 11/2004 | Kung et al. | 370/260 |
| 6,961,416 B1 * | 11/2005 | Summers et al. | 379/202.01 |
| 2006/0250987 A1 * | 11/2006 | White et al. | 370/260 |

FOREIGN PATENT DOCUMENTS

| | | |
|---|---|---|
| WO | 99-27701 A1 | 6/1999 |

OTHER PUBLICATIONS

Fredette, Paul; "The Past, Present and Future of Inverse Multiplexing;" IEEE; Apr. 1994; pp. 42-46.

Supplemental European Search Report received in co-pending European Application Serial No. 01908089.4; Sep. 2004.

ITU-T Recommendation H.323: "Visual Telephone Systems and Equipment for Local Area Networks which Provide a Non-Guaranteed Quality of Service," International Telecommunication Union; Nov. 1996.

* cited by examiner

SYSTEM AND METHOD FOR PROVIDING RESERVATIONLESS CONFERENCING

RELATED APPLICATIONS

This application is a continuation of U.S. patent application Ser. No. 10/954,934, filed Sep. 30, 2004, now U.S. Pat. No. 7,310,320, which is a divisional application of U.S. patent application Ser. No. 09/790,577, filed Feb. 22, 2001, now U.S. Pat. No. 7,085,243, which claims priority to provisional application No. 60/186,002, filed Mar. 1, 2000. Each of U.S. patent application Ser. No. 10/954,934, U.S. patent application Ser. No. 09/790,577, U.S. Pat. No. 7,085,243, and provisional application No. 60/186,002 are incorporated herein by reference in their entirety and priority to each of these applications is hereby claimed.

TECHNICAL FIELD

This invention relates to the field of audio and video conferencing and, more particularly, relates to automating the process of coordinating and setting up audio and video conferences.

BACKGROUND

Traditionally, customers wishing to use a multi-point video conferencing service must reserve their conferences in advance. The customer must provide several parameters to complete such a reservation, including the number and types of terminals, line-speed, type of audio algorithm, start-time, end-time, video algorithm, type of network, along with other pertinent parameters. Providing these parameters presents a problem to both conference participants and service providers due to the fact that acquiring this information is difficult and providing this information makes the process of setting up or initiating a conference tedious and inconvenient. In addition, the customer must provide this information well in advance of the actual conference to reserve time and resources, and to allow adequate time to process the information and incorporate it into the conference setup.

Companies that provide video conferencing services typically use reservation-based systems to manage the service. Using such a service, a client contacts the service provider prior to the start of the conference to book or reserve the conference and any necessary facilities or resources. When making the reservation, the customer must provide the service operator with parameters, such as the number and types of terminals, line-speed, type of audio algorithm, start-time, end-time and other parameters. In response, the service operator must input these parameters into the reservations system.

FIG. 1 is a block diagram illustrating a typical system architecture of an audio/video conferencing system. Using a system as illustrated in FIG. 1, a service provider sets up an audio and/or video conference for a customer by completing the following tasks:

(1) A customer administrator 120 contacts, using a telephone, facsimile, e-mail or other means 2 a service provider operator 112.

(2) The service provider operator 112 receives conference parameters from the customer administrator 120 and loads them into the reservation system via an operator console 116.

(3) The service provider operator 112 notifies the customer administrator 120 with a confirmation of the reserved conference details (for example: the ISDN number(s) that will be used to connect to the conference).

(4) The customer administrator 120 provides the details of the conference, such as start-time and the number to call, to the participants or terminals 114 that will participate in the conference.

(5) The video conference is started on the service provider's MCU 110 at the reserved time and lasts for the predefined duration. During this time the conference terminals 114 can be connected to the conference.

(6) When the duration set for the conference is over, the conference is terminated and the terminals 114 are disconnected.

For each customer that attempts to set up a conference call, each step in the process must be repeated.

These prior art techniques for reserving and initiating conferences are disadvantageous for several reasons. One reason is that the prior art techniques require a cumbersome reservation procedure. Also, if the actual duration of the conference is longer than the reserved time, the conference may terminate in the middle of a discussion. If the actual duration of the conference is shorter than the reserved time, the customer will end up paying for the unused time. Thus, there is a need in the art for a system and method to schedule and reserve audio and/or video conferences that allows more flexibility in the length of the conference.

Another disadvantage in the prior art techniques is that they do not allow any flexibility in the start-time of the conference and/or the number of participants in the conference. In today's complex world, conferences are often times canceled at the last minute. Using the reservation techniques in the prior art, this lack of flexibility can be quite costly. Thus, there is a need in the art for a system and method to schedule and reserve audio and/or video conferences that allows more flexibility in the start time of the conference and the number of participants.

Yet another disadvantage of the prior art techniques is that they require extensive overhead to set up a conference. For instance, an operator is required on the service provider side and a conference administrator is required on the customer side. This overhead escalates the cost associated with providing audio and/or video conferencing services. Thus, there is a need in the art for a system and a method to schedule and reserve audio and/or video conferences that limits the amount of required overhead.

Therefore, it is clear that there is a need in the art for a system and a method for providing reservationless audio and/or video conferences.

SUMMARY

The present invention solves the above-described problems by providing a system and method for providing reservationless conferences. In general, the present invention removes the need for reservations. Instead, customers are able to initiate their own conferences at their convenience, without the need for pre-booking or operator intervention.

The present invention advantageously limits or eliminates the need for a human operator. Using the present invention, a moderator can initiate the conference without contacting an operator. Instead, the moderator simply initiates the conference by dialing a dial-in conference number. In addition, the present invention eliminates the need to identify the conference start-time, the conference duration and the number of needed resources, such as the number of participants, prior to reserving the conference. Another aspect of the present invention is an auto rate detector. The auto rate detector enables the connection of terminals to a conference without any prior knowledge about the terminal capabilities, such as the type of terminal, the terminal bit rate, or the like. Advantageously, this aspect of the present invention reduces overhead required in setting up a conference. Yet another aspect of the present invention is an auto termination and auto extend feature. The auto termination feature advantageously allows a conference to be disconnected without requiring user intervention. The auto extension feature of the present invention advantageously allows conferences in indefinite duration to be reserved.

DETAILED DESCRIPTION

Turning now to the figures in which like numeral represent like elements throughout the several views, several exemplary embodiments of the present invention are described.

A first exemplary embodiment of the present invention is a limited operator system. In this embodiment, the system assigns a dial-in number to a customer, a dial-in number can be a telephone number, an IP address or the like. The customer, and conference co-participants, use this dial-in number whenever they want to have a conference. When a participant uses his or her terminal to dial this number, the system will automatically initiate the conference. In addition, for each terminal that dials this number, the system will automatically connect the terminal into the conference. When all participants disconnect, the conference is terminated. Using this embodiment of the present invention, the participants can initiate the conference at anytime by simply by dialing the conference number. Thus, this embodiment of the present invention only requires a one-time contact with an operator in order to acquire the dial-in number. This one-time can be performed at anytime without connection to a certain conference.

Figure 1:
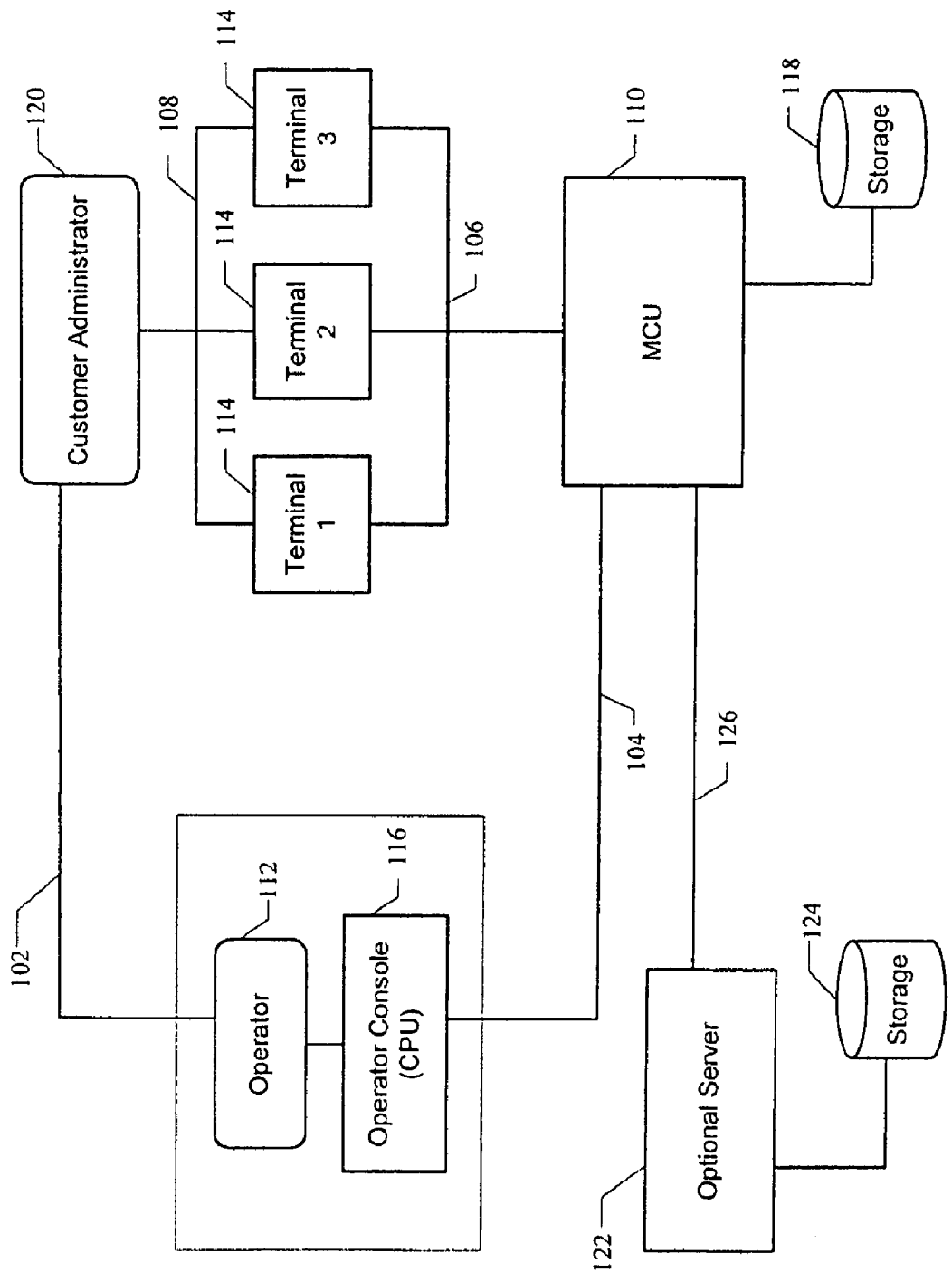
FIG. 1 is a block diagram illustrating a typical system architecture of an audio and/or video conferencing system of the present invention.

FIG. 1. is a block diagram illustrating a typical system architecture of an audio and/or video conferencing system. The limited operator exemplary embodiment of the reservationless system of the present invention is similar to that in FIG. 1, with the crucial difference that after the dial-in number has been assigned, the operator 112 is no longer required. The limited operator embodiment includes a multi-point control unit ("MCU") 110 and an operator console 116. The MCU is a conference controlling entity that typically is a piece of equipment located in a node of the network or in a terminal which receives several channels from access ports and, according to certain criteria, processes audiovisual signals and distributes them to the connected channels. Examples of MCU's include the MGC-100 which is available from Polycom, Inc., the assignee of the present invention. Additional information about the MGC-100 can be found at the website of www.polycom.com. The MCU 110 and the operator console 116 are typically located at a service provider site, although this is not mandatory. Each participant in a conference utilizes a terminal 114. A terminal is an endpoint on a network, capable of providing real-time, two-way audio and/or visual communication with other terminals or an MCU. The information communicated between the terminals and/or the MCU includes control signals, indicators, audio, moving color video pictures and/or data. A terminal may provide speech only, speech and data, speech and video, or speech, data and video. A more thorough definition of a terminal can be found in the International Telecommunication Union ("ITU") standards H.320, H.321 and H.323. The ITU is the United Nations Specialized Agency in the field of telecommunications. The ITU Telecommunication Standardization Sector (ITU-T) is a permanent organ of the ITU. The ITU-T is responsible for studying technical, operating and tariff questions and issuing recommendations on them with a view to standardizing telecommunications on a worldwide basis. Additional information regarding the ITU can be found at the website address of www.itu.int.

The customer administrator 120 can exert control over each of the terminals 114 through an administrator/terminal interface 108. Each terminal 114 interfaces to the MCU 110 over a conference interface 106. The MCU 110 includes a memory storage element 118 and communicates with the operator console 116 over the operator console to MCU interface 104. Optionally, the MCU 110 may interface to an optional server 122 having an additional storage element 124.

Figure 2:
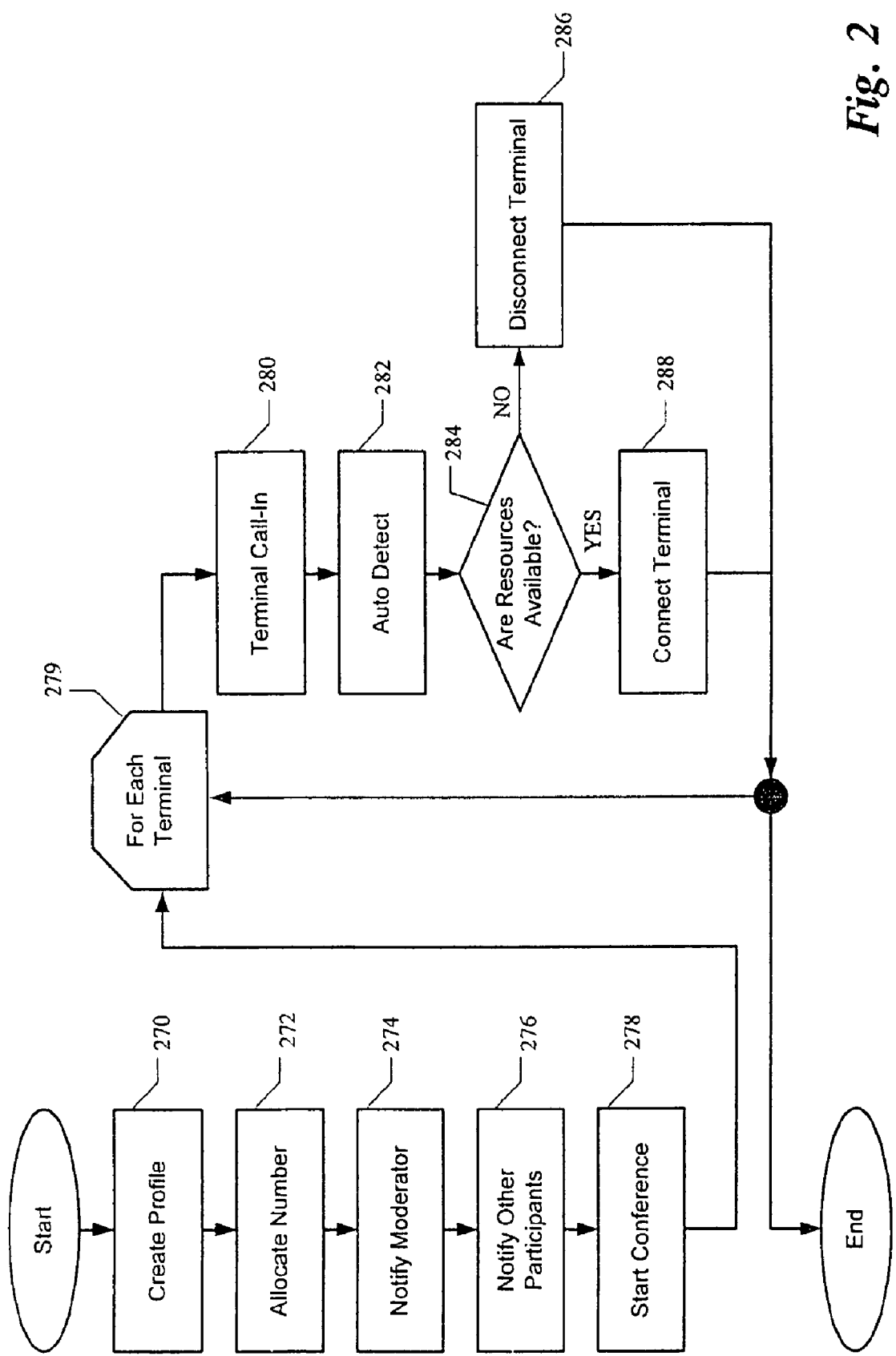
FIG. 2 is a flow diagram illustrating the steps performed in an exemplary embodiment of creating a reservationless conference.

FIG. 2 is a flow diagram illustrating the steps involved in an exemplary embodiment of creating a reservationless conference. The customer initiating or organizing the conference is referred to as a moderator. Initially, the moderator creates a conference profile 270. To accomplish this, the moderator communicates with the operator and defines the parameters of the conference, such as the maximum bit-rate, whether or not transcoding is to be used, the video layout, or similar information. The moderator is not required to provide the conference start-time, duration, or the number of participants in the conference. Once the operator enters the conference profile into the system, a conference profile form is sent via the operator console 116 to the MCU 110 over an operator console to an MCU interface 104.

Next a dial-in number is allocated for the conference 272. Upon receiving the conference profile form, the MCU 110 assigns a dial-in number for the conference. The MCU 110 is configured to have a range of dial-in numbers, and the dial-in numbers are allocated to conference profiles using an assignment algorithm. The assignment algorithm can be in a variety of forms and the present invention is not limited to any particular algorithm. In an exemplary embodiment, the assignment algorithm may be a first come first served algorithm. As an example of using the first come first served algorithm, if the range of numbers held by the MCU 110 is 1000 to 5000, then the first conference profile will get the number 1000, the second will get 1001, etc. After assigning a dial-in number, the MCU 110 notifies the operator 112 that the dial-in number has been assigned. The MCU 110 provides this notice through the operator console 116 via the operator console to the MCU interface 114.

After receiving the dial-in number from the operator console 116, the operator 112 notifies the moderator or any participant in the conference of the conference dial-in number 274. The moderator distributes the conference dial-in number 276 to the other participants of the conference using a variety of techniques including, but not limited to, placing a telephone call, or sending notice in the mail, e-mail, or facsimile.

Once a conference profile has been created, the moderator can delete the conference profile at any time by contacting the operator 112 to delete the conference. The operator 112, upon receiving such notice, will delete the conference profile via the operator console 116. After deleting a conference profile, or in conjunction therewith, the operator console 116 notifies the MCU 110. In response to receiving such notice, the MCU 110 removes the conference profile record from its internal storage 118, allowing for the dial-in number to be reallocated to new conference profiles. In an alternate embodiment, the moderator may be given access to the operator console to delete the profile without the interaction with the operator 112.

When the moderator, or any participant, wishes to start the conference 278, he/she dials the dial-in number from a terminal 114. Upon receiving the call, the MCU 110 searches for a conference profile match. A conference profile match is found if a conference profile has the same dial-in number that was called. To identify a match, the MCU 110 searches its internal storage 118 for a conference profile match. If such a match is found, the MCU 110 starts the conference immediately. The start-time of the conference is the current time and the conference will last for a pre-defined time duration T. The value of T is part of the MCU 110 conference profile.

If a conference profile match is not found, the MCU 110 may optionally connect to an external or optional server 122. The optional server 122 includes a processing unit with a storage device 124 connected to the MCU 110 via a network connection or some other communication path 126. The MCU 110 provides the dial-in number to the optional server 122. The optional server 122 searches its internal storage 124 for a conference profile with the same dial-in number. If such a conference profile is found, the optional server 122 orders the MCU 110 to start the conference immediately. Again, the start-time of the conference is the current time, and the duration of the conference is a pre-defined time duration T as previously defined.

If a match is not found, the MCU 110 may reject the call, display an audiovisual message to the calling terminal and/or transfer the call to a service provider operator. The remaining steps of this embodiment of the invention are described below following a description of an alternate embodiment of the present invention. The following steps, 279 to 288, are described after the description of FIG. 3.

Figure 3:
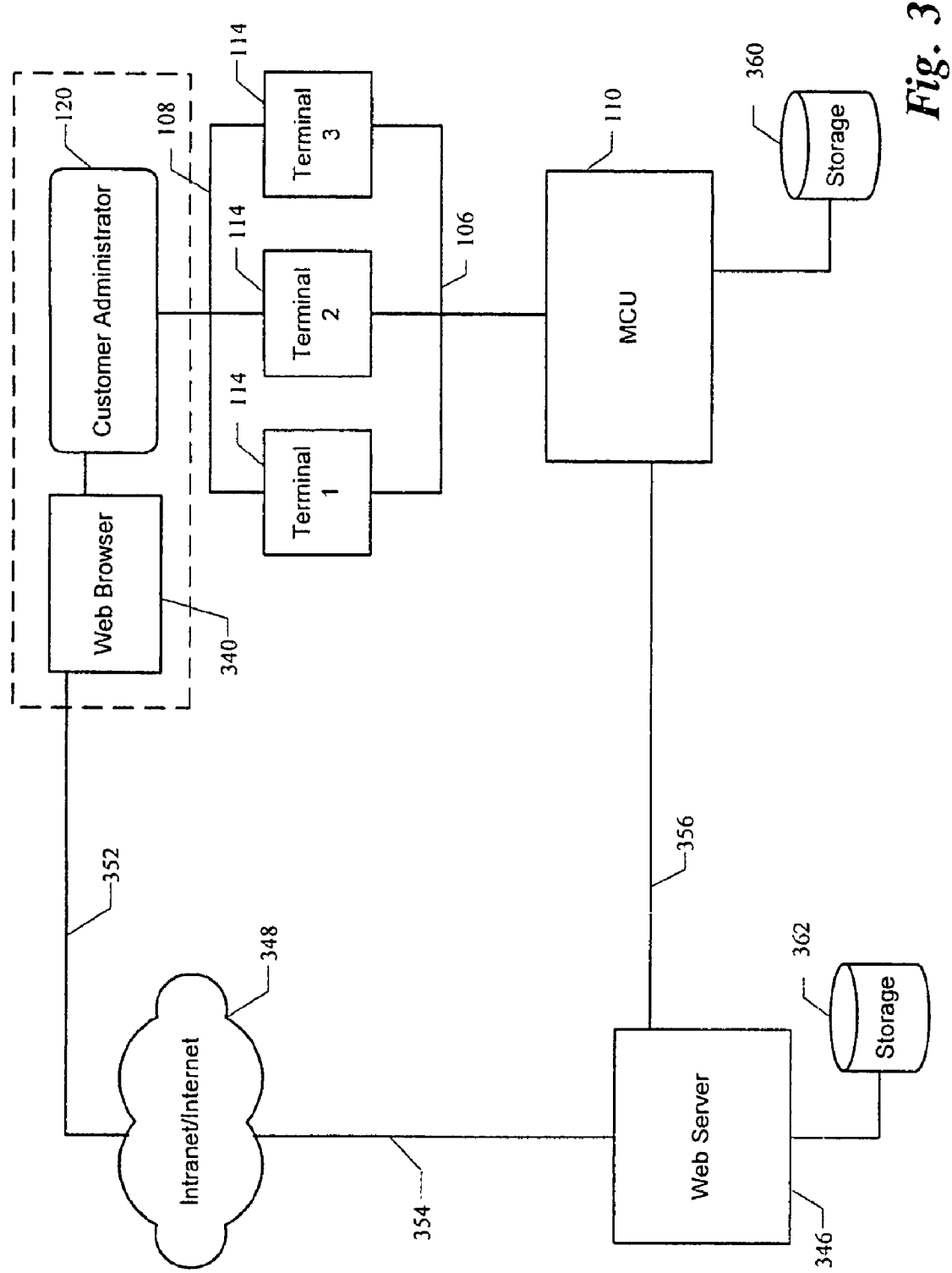
FIG. 3 is a block diagram illustrating an exemplary embodiment of the present invention.

FIG. 3 is a block diagram illustrating a second exemplary embodiment of the present invention. The second exemplary embodiment of the present invention is an operator independent system. In this embodiment of the present invention, the need for the operator is totally eliminated. The reservationless system in this embodiment includes, but is not limited to, an MCU 110, a web server 346, and a web browser 340. One possible configuration for the web server 346 is a Microsoft NT server running IIS4. The web browser 340 may include a variety of commercially available browsers, such as the Microsoft Internet Explorer, or a proprietary browser. The web browser 340 connects to an intranet or Internet 348 over a first connection 352. The web server 346 is connected to the intranet or Internet 348 over a second connection 354. Thus, the web browser 340 can connect to the web server 346 via the intranet or Internet 348.

The web browser can actually be any communication program that can interface to the web server over a networked connection. Thus, the present invention is not limited to a web browser, or any particular web browser. In general, the functions of the web browser can be performed by a variety of communication programs including terminal emulators, FTP programs, SMTP programs or the like.

The MCU 110 and the web server 346 are typically located at the service provider site; however, this is not mandatory. Typically, the MCU 110 and the web server 346 communicate over a network communication connection 356. The network communication connection 356 may be an intranet, the Internet, a local area network, or any other communication connection capable of interfacing the web server 346 to the MCU 110. The web browser 340 is typically located at the customer site. A customer administrator 120 using a web browser 340 connects to a website hosted by the web server 346. The customer administrator 120 can create conference profiles, and optionally initiate conferences and monitor conferences via this connection to the website. The web server 346 may include additional server capabilities or may interface to another server to provide conferencing control. The web server 346 provides a dial-in number for each conference profile. When a terminal 114 dials the dial-in number, the MCU 110 automatically initiates a conference. The MCU 110 also automatically connects each terminal 114 that dials this dial-in number. When all participants disconnect, the MCU 110 terminates the conference. This conference can be initiated anytime at the will of the participants simply by dialing the dial-in number as long as resources are available.

Referring again to FIG. 2, the initial steps required in this embodiment of the present invention will be described. Similar to the first embodiment, the customer that initiates the conference, the customer administrator 120, will be referred to as the moderator.

Initially, the moderator 120 creates a conference profile 270. To accomplish this, the moderator 120 connects to the web service and logs onto the web server 346 (for example: by providing a user name and a password). The moderator 120 is presented with a conference profile form for defining the conference parameters. The conference parameters may include the maximum bit-rate, whether or not transcoding is to be used, the video layout, whether the conference is a dial-in or a dial-out conference (in a dial-in conference the participant calls the dial-in number, in a dial-out conference the MCU calls the participants), or the like. Optionally, these parameters can have default values so the moderator 120 does not have to provide them. The moderator 120 is not required to enter the conference start-time, duration, or the number of participants in the conference.

Once the conference profile is completed, or as information is provided by the moderator 120, the conference profile form, and/or information, is sent via the web browser 340 to the web server 346. Next, a conference dial-in number is allocated 272. The web server 346 then allocates a dial-in number for the conference 272. The web server 346 is configured to have a range of dial-in numbers, and it allocates them to conference profiles using an assignment algorithm similar to that described in the first embodiment. After assigning a dial-in number, the web server 346 notifies the moderator 120 with the allocated dial-in number 274 through the web browser 340. In addition, the web server 346 may optionally notify the MCU 310, or other conference participants with the new conference profile parameters and its dial-in number.

The web server 346 provides the dial-in number to the moderator 120, or optionally any participant in the conference 276. The moderator 120 can distribute the conference dial-in number to the other participants or terminals 314 of the conference using a telephone, regular mail, e-mail, facsimile, or other similar means.

Once a conference profile has been created, the moderator 120 can delete the conference profile by contacting the web server 346 using the web browser 340. The web browser 340 will show the moderator 120 a list of existing conference profiles and the moderator 120 may select to delete one or multiple of these conference profiles. When a conference profile is deleted, the web browser 340 notifies the web server 346. In response to receiving this notice, the web server 46 removes the conference profile record from its internal storage 362. The web server 346 may optionally notify the MCU 110 that the conference profile has been deleted. The MCU 110 may then proceed to delete the conference profile from it's internal memory 360. The dial-in number previously assigned can then be allocated to new conference profiles.

In a dial-out conference, when the moderator 120 wishes to start the conference, he connects to the web server 346 using the web browser 340. The moderator 120 is presented with an option to start the conference identified in the conference profile. When the moderator 120 selects to start the conference, the command is sent to the web server 346. The web server 346 then sends a message to the MCU 110 to start the conference immediately. In a dial-in conference, the moderator or any other participant may start the conference by dialing the dial-in number. The start-time of the conference is the current time and the duration of the conference will be a pre-defined time T. The actual value of T is part of the conference profile.

Once the conference is started on the MCU 110, the participants may join the conference by calling the dial-in number from their terminals 114.

The remaining steps illustrated in FIG. 2 are common to both the above-described first and second embodiments of the present invention. For each terminal 114 that a participant uses to request entrance into the conference 279, the requesting terminal 114 simply initiates a call to the dial-in number 280. As each terminal 114 joins the conference, the MCU 110 uses an auto-detection procedure 282 to identify the connecting terminals 114 and their parameters. The auto-detection procedure 282 ensures that all terminals 114 connect to the conference successfully. More specifically, the goal of the auto-detection procedure 282 is to determine the connection rate for the requesting terminal 114, and the type of terminal that is making the request. Initially, the MCU 110 receives, with the connection message from the terminal 114, information about the type of the call that the terminal 114 is initiating. In an exemplary embodiment, this step can be performed in accordance with the Q.931 standard, which is known to those skilled in the art. If the call type is VOICE (for example: a PSTN phone device), the MCU 110 decides that the terminal 114 is a voice only terminal, which uses a single channel. The MCU 110 continues the connection procedure for a voice terminal. The exact steps required for this process are known to those skilled in the art and are more thoroughly describe in the ITU standards H.242 and H.221.

If the call type is not VOICE, the MCU 110 attempts to connect to the terminal 114 in a technique known as Bandwidth On Demand Interoperability Group ("BONDING"). BONDING is a method of aggregating communication channels. This is a technique of aggregating B channels at the bit level. B channels are basic user channels that do not carry signaling information. If the BONDING connection succeeds, the terminal 114 requests a connection rate using the BONDING protocol. The MCU 110 adopts this rate as the terminal connection line rate and continues with the connection procedure for a BONDING terminal. However, if the BONDING negotiation fails (e.g., a time out has occurred because there was no valid response from the terminal), the MCU 110 reverts to H.221 negotiation mode and tries to exchange capabilities with the terminal following the procedure described in the ITU standards H.242 and H.221.

If the H.221 capabilities exchange succeeds, the terminal 114 notifies the MCU 110 of its highest connection rate capabilities. The MCU 110 selects the terminal communication rate as the minimum of the terminal maximum rate (known by the terminal capabilities) or the conference maximum rate (the conference maximum rate is part of the conference profile).

Once the line rate and the terminal type are identified using the auto detection procedure 282, the MCU 110 determines if there are enough available resources for the terminal 114. The MCU 110 keeps a record of the total number of currently available resources and their types. For example, a resource type can be an audio codec, a video codec, or the like. A codec is a device used to decode or encode data and the various types and operations of a codec are known to those skilled in the art. The MCU 110 checks if the number of free (unused) resources is higher than or the same as the number of resources needed for the terminal 114 to connect to the conference 284. If sufficient resources are available, the terminal 114 is connected to the conference 288. The number of resources required by the terminal 114 are then deducted from the total number of available resources maintained and monitored by the MCU 110. However, if the MCU 110 determines that insufficient resources are available for the terminal 114, the terminal 114 is disconnected 286 from the MCU 110.

Conference Control and Monitoring

Another aspect of the present invention is to provide a method to control and monitor a video conference. During the conference, participants with access to a web browser 340 can be connected to the web server 346 to monitor and, optionally, control the conference though the web browser 340. The conference status (e.g., the number of connected parties, state of the video mute for each party, state of the audio mute for each party) is automatically updated and displayed on the browser screen. Participants can perform actions on the conference terminals 114 such as, connecting or disconnecting parties, activating or deactivating video or audio mute, requesting to extend the conference time, terminating the conference, or the like.

Conference Termination

Figure 4:
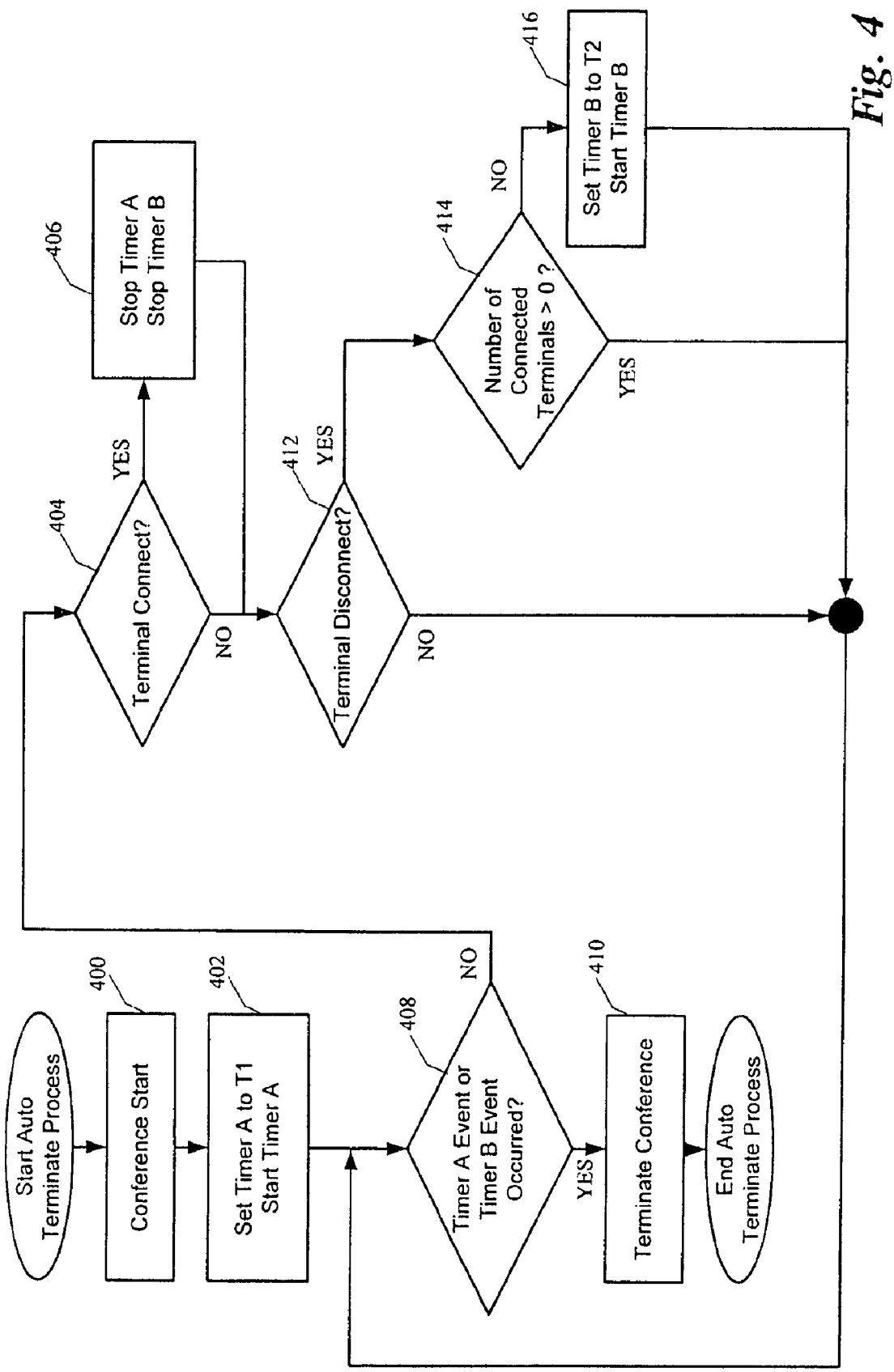
FIG. 4 is a flow diagram illustrating the operation of performing the auto terminate aspect of the present invention.

FIG. 4 is a flow diagram illustrating the operation of performing the auto terminate aspect of the present invention. The auto termination algorithm is used to terminate a conference when it is no longer active (i.e., no terminals are connected). This process can be performed without prior knowledge of the conference duration. Advantageously, the auto termination process prevents inactive conferences from taking up resources that could be used by other conferences.

Each conference established through the use of the present invention includes two configurable time periods. One time period ("T1 or before-first-join") is the time limit for joining the conference. If no terminals connect to the conference within the T1 time period from starting the conference, the conference is automatically terminated. Another time period ("T2 or after-last-quit") is the time limit for holding the conference after the last participant has left the conference. If a party connects to the conference within the T2 time period, the termination count-down is stopped. In operation, the MCU 110 starts or accepts a conference initiation 400. The MCU activates the auto terminate feature only after at least one participant fully connects to the conference. Once a terminal is connected, the MCU 110 then sets a first timer ("Timer A") to the value of the T1 time period 402. Once the auto terminate feature is active, the MCU activates the count-down timers A and B when it detects that there are no active participants, either connecting, partially connected or fully connected, in the conference. If Timer A expires 408 prior to another terminal being connected 404, the MCU will terminate the conference 410. If another terminal is connected prior to Timer A expiring, the MCU will stop the Timer A count-down 406. Once all of the terminals are disconnected from the conference 412 414, the MCU will set a second timer ("Timer B") to the T2 time period and initiate the count-down of the Timer B. If Timer B expires prior to a terminal connecting to the conference 404, then the conference will be terminated. Otherwise, the count-down of Timer B will be halted 406 and the conference will continue.

If time periods T1 or T2 are zero, the auto terminate feature will not be active. In this state, the web browser 340, an operator, or an H.243 chair control terminal can be used to terminate the conference.

Although the auto terminate feature is described as being included in the reservationless conferencing system, those skilled in the art will appreciate that this aspect of the present invention may also be used in reservation-based conferencing systems. In either system, because the MCU's 110 resources are limited, a conference may have to be terminated to facilitate beginning a new reserved conference.

Auto Extension of Conference

Figure 5:
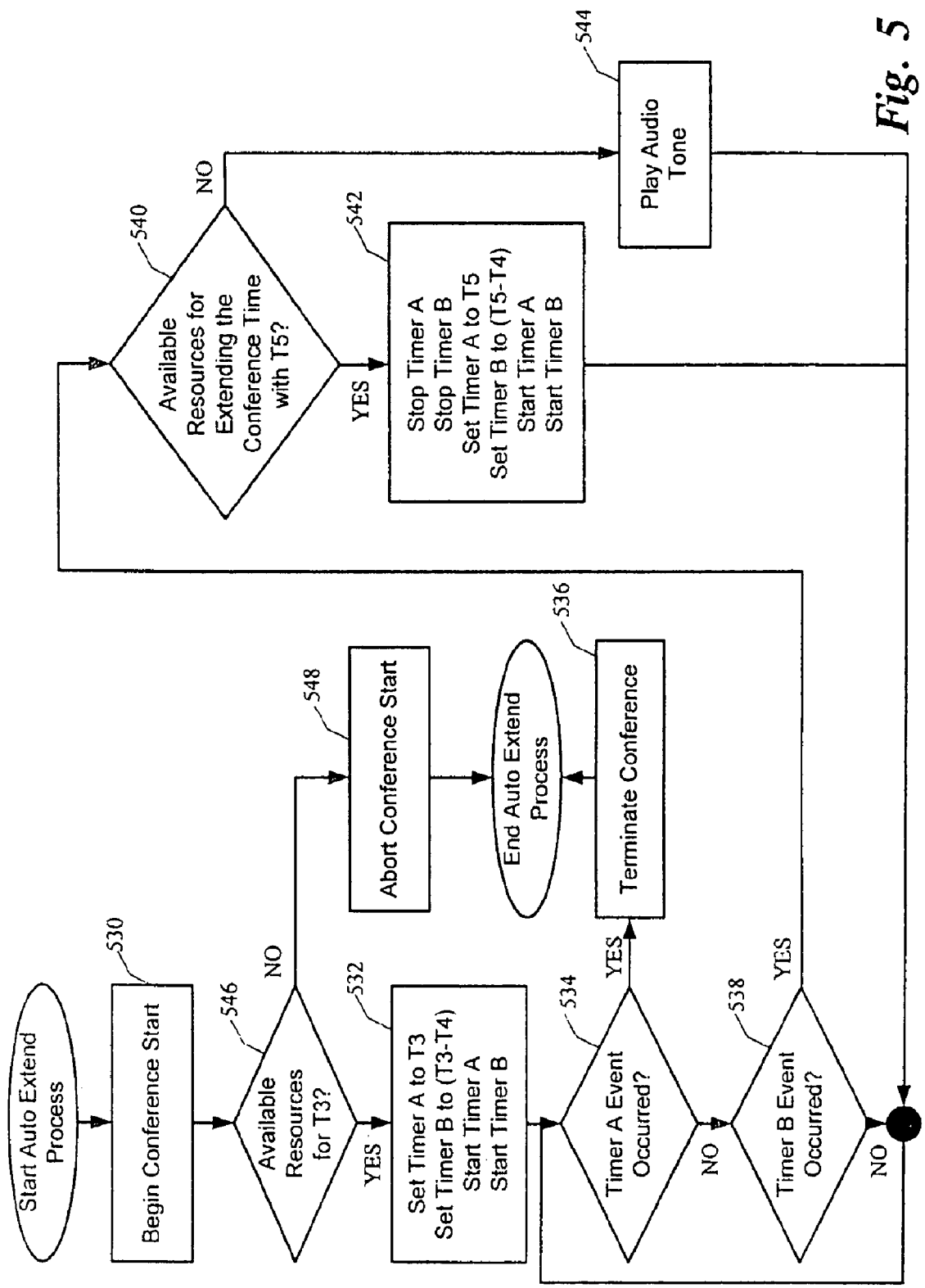
FIG. 5 is a flow diagram illustrating the auto extension aspect of the present invention.

FIG. 5 is a flow diagram illustrating the auto extension aspect of the present invention. Conferences initiated with embodiments of the present invention do not require a duration or a termination time. Instead, a pre-defined, MCU configured duration is used as a default duration. However, to prevent terminating a conference prior to it's natural ending, an auto extension algorithm may be incorporated into embodiments of the present invention. The auto extension algorithm extends a reservationless conference as long as resources are available, and optionally provides an audio tone warning to participants before the conference is terminated.

The system assigns three time intervals to each conference:
T3—minimum conference time;
T4—audio tone warning time prior to end of conference; and
T5—conference extend interval.

Preferably, T4 is less than or equal to T3 and/or T5. Upon initiation of a conference 530, the MCU 110 determines if sufficient resources are available for the conference to be active for a T3 time period 546. If sufficient resources are not available, the MCU 110 will abort the initiation of the conference 548. If sufficient resources are available, the MCU 110 will set a first timer ("Timer A") to time period T3, set a second timer ("Timer B") to a time period determined by the difference of T3 and T4, and start both Timer A and Timer B 532. If Timer A times out 534, the MCU 110 will terminate the conference 536. If Timer B times out, the MCU will determine if sufficient resources are available for the conference to be extended for a time period of T5 540. If sufficient resources are available, the MCU 110 will extend the conference duration by a time period of T5 by (a) stopping Timer A and Timer B, (b) setting Timer A to time period T5, setting Timer B to a time period determined by the difference of T5 and T4, and (c) starting Timer A and Timer B 542. This allows the conference to continue, or to be automatically extended by the time period of T5. If sufficient resources are not available, the MCU 110 will play an audio tone 544 to notify the participants that the conference may be terminating soon. If the MCU 110 detects that sufficient resources are available prior to the expiration of Timer B, then the conference can be extended by a time period of T5 by (a) stopping Timer A and Timer B, (b) setting Timer A to time period T5, setting Timer B to a time period determined by the difference of T5 and T4, and (c) starting Timer A and Timer B 542.

Figure 6:
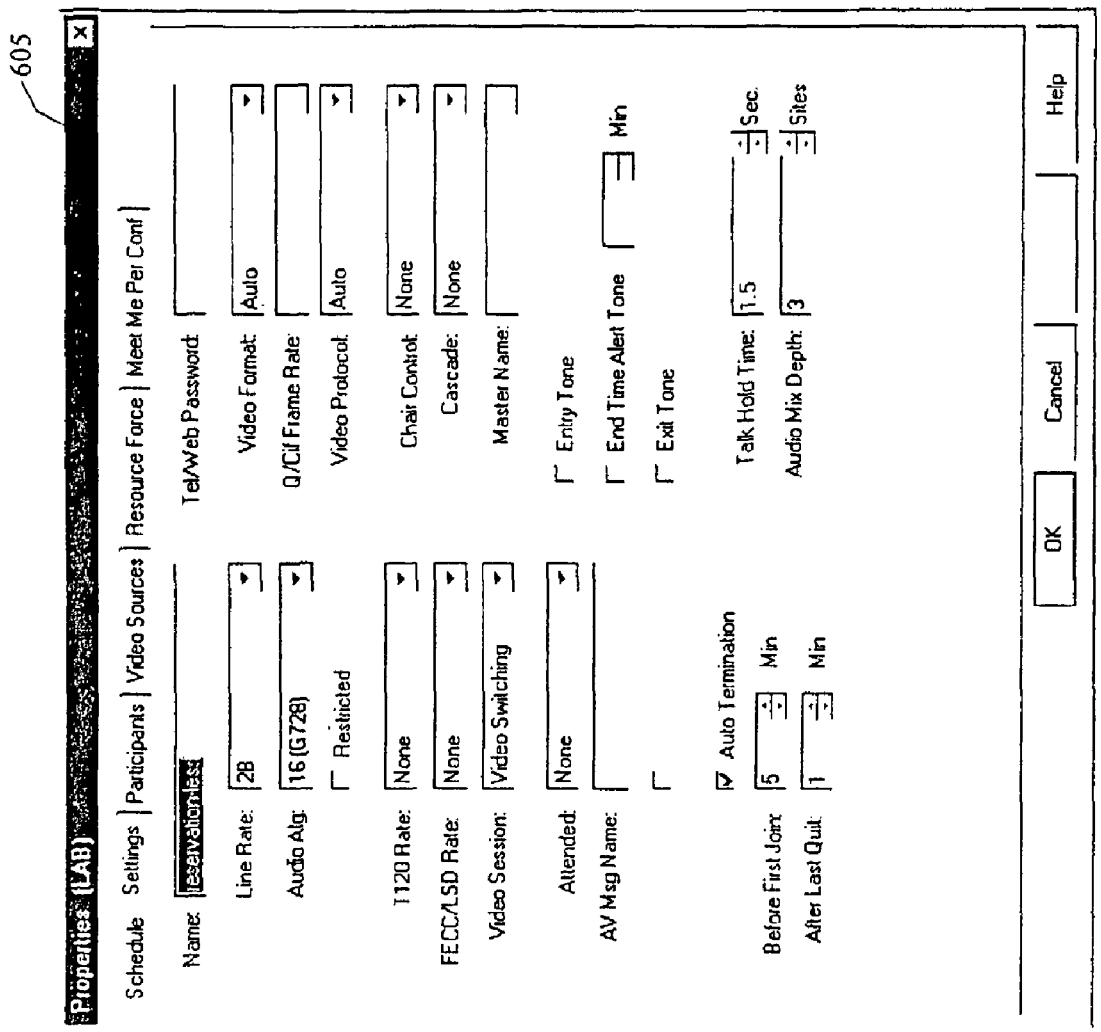
FIG. 6 is a screen image of an exemplary embodiment of a user interface showing conference profile settings.

FIG. 6 is a screen image of an exemplary embodiment of a user interface showing conference profile settings. In an exemplary embodiment of the present invention, a user interface 605 is provided for the user to specify a conference profile. Those skilled in the art will appreciate that alternate user interfaces may be used to allow the user to specify the conference profile.

The present invention has been described in relation to particular embodiments which are intended in all respects to be illustrative rather than restrictive. Those skilled in the art will understand that the principles of the present invention may be applied to, and embodied in, various program modules for execution on differing types of computers and/or equipment, operating in differing types of networks, regardless of the application.

Alternate embodiments will become apparent to those skilled in the art to which the present invention pertains without departing from its spirit and scope. Accordingly, the scope of the present invention is described by the appended claims and supported by the foregoing description.

What is claimed is:

1. A system for providing reservationless conferencing, comprising:
   a conference control entity for controlling a conference among a plurality of participants at a plurality of multimedia terminals; and
   a web server communicatively coupled to the conference control entity through a first connection and communicatively coupled to a customer administrator terminal through a second connection, the customer administrator terminal including a communication program and being communicatively coupled to at least one of the plurality of terminals;
   the web server being operative to:
      receive a request from the customer administrator terminal for defining a reservationless conference associated with a conference profile;
      respond to the request for defining the reservationless conference by allocating a dial in number for calling the conference control entity wherein the dial in number indicates the conference profile to the conference control entity; and
      distribute the dial in number,
   wherein the conference control entity is operative to:
      receive a call from a multimedia terminal calling the dial-in number;
      initiate the conference based on the profile that is indicated by the dial in number; and
      initiate an auto termination process that is capable of auto terminating the conference session when only one conferee is connected to the session, based on a first timing parameter of the indicated profile, and when no conferees are connected to the session, based on a second timing parameter of the indicated profile.

2. The system of claim 1, wherein the dial in number is distributed to a participant or a moderator of the reservationless conference.

3. The system of claim 1, wherein the dial in number is distributed to the conference control entity.

4. The system of claim 1, wherein the web server is further operative to: receive a request to initiate a reservationless conference; determine if sufficient resources for the participant are available; and instruct the conference control entity to start the reservationless conference.

5. The system of claim 1, wherein the web server is communicatively coupled to the conference control entity through the Internet.

6. The system of claim 1, wherein the web server is communicatively coupled to the conference control entity through an intranet.

7. The system of claim 1, wherein the conference control entity is a multipoint control unit.

8. The system of claim 1, wherein one or more of the plurality of multimedia terminals conform to the H.320 standard.

9. The system of claim 1, wherein one or more of the plurality of multimedia terminals conform to the H.323 standard.

10. The system of claim 1, wherein the conference control entity initiates the conference if resources for the multimedia terminal are available and the conference is not active, wherein the conference control entity connects the multimedia terminal to the conference if resources for the multimedia terminal are available and the conference is active, and wherein the conference control entity disconnects the multimedia terminal if resources for the multimedia terminal are not available.

11. A system for providing reservationless conferencing, comprising:
   a conference control entity for controlling a conference among a plurality of multimedia terminals and configured to respond to an order for a reservationless conference by a customer administrator; and
   a server communicatively coupled to a storage device and communicatively coupled to the conference control entity;
   the server being operative to:
      receive and store a plurality of profiles of reservationless conferences, each profile associated with a dial-in number for calling the conference control entity;
      receive a request from the conference control entity for a conference profile associated with a particular dial-in number;
      search the storage device for a matched profile; and
      deliver the requested profile to the conference control entity,
   wherein the conference control entity is operative to:
      receive a call from a multimedia terminal calling the dial-in number;
      initiate the conference based on the profile that is indicated by the dial in number; and
      initiate an auto termination process that is capable of auto terminating the conference session when only one conferee is connected to the session, based on a first timing parameter of the indicated profile, and when no conferees are connected to the session, based on a second timing parameter of the indicated profile.

12. The system of claim 11, wherein the conference control entity initiates the conference if resources for the multimedia terminal are available and the conference is not active, wherein the conference control entity connects the multimedia terminal to the conference if resources for the multimedia terminal are available and the conference is active, and wherein the conference control entity disconnects the multimedia terminal if resources for the multimedia terminal are not available.

* * * * *